US012350629B2

(12) United States Patent
O'Malley

(10) Patent No.: US 12,350,629 B2
(45) Date of Patent: Jul. 8, 2025

(54) SYSTEMS AND METHODS FOR INVERSION FILLING OF RESERVOIRS

(71) Applicant: Patrick M. O'Malley, Chicago, IL (US)

(72) Inventor: Patrick M. O'Malley, Chicago, IL (US)

( * ) Notice: Subject to any disclaimer, the term of this patent is extended or adjusted under 35 U.S.C. 154(b) by 78 days.

(21) Appl. No.: 18/371,442

(22) Filed: Sep. 21, 2023

(65) Prior Publication Data

US 2025/0099927 A1 Mar. 27, 2025

(51) Int. Cl.
*B01F 25/00* (2022.01)
*E03B 11/00* (2006.01)
*B01F 101/00* (2022.01)

(52) U.S. Cl.
CPC .............. *B01F 25/00* (2022.01); *E03B 11/00* (2013.01); *B01F 2025/919* (2022.01); *B01F 2101/305* (2022.01)

(58) Field of Classification Search
CPC ........................... B01F 25/00; B01F 2025/919
See application file for complete search history.

(56) References Cited

U.S. PATENT DOCUMENTS

| | | | |
|---|---|---|---|
| 5,735,600 | A | 4/1998 | Wyness et al. |
| 6,016,839 | A | 1/2000 | Raftis et al. |
| 7,104,279 | B2 | 9/2006 | Raftis et al. |
| 7,748,891 | B2 | 7/2010 | Tysse et al. |
| 9,517,946 | B2 | 12/2016 | Lin-Hendel |

*Primary Examiner* — Paul J Gray
(74) *Attorney, Agent, or Firm* — Oldaker Low P.C.; Joseph P. Oldaker

(57) ABSTRACT

Devices, methods, and systems for filling reservoirs including but not limited to an apparatus comprising a first transition conduit assembly; where the first transition conduit assembly includes a first inversion chamber housing connected to a first transition conduit, and the first inversion chamber housing includes a frustoconical portion; the first transition conduit assembly is adapted to create a first inversion gap when positioned above an inlet of the water storage tank; where the apparatus may further include a second transition conduit assembly and the second transition conduit assembly is adapted to create a second inversion gap when positioned above the first transition conduit assembly.

20 Claims, 4 Drawing Sheets

SYSTEMS AND METHODS FOR INVERSION FILLING OF RESERVOIRS

FIELD OF THE INVENTION

Embodiments of the present disclosure relate generally to water reservoirs, and methods and apparatuses for filling the same. More particularly, this disclosure relates to devices and methods for the efficient delivery of new water to and draining of old water from reservoirs.

BACKGROUND OF THE INVENTION

Public water supplies, water districts, fire districts, and industries commonly use enclosed elevated and ground level water reservoirs to store water for drinking and supporting fire suppression, public health, and other purposes. These reservoirs provide water that can be used to meet the demands of the water distribution system. Usually, water is pumped into and drawn out of a lower portion of a reservoir. In a typical reservoir, the last water added to the tank would be the first water to be removed, due to the location of inlet/outlet being in the lower portion of the reservoir. Consequently, the water near the top of the reservoir would normally be the last water to be removed, and in some cases, would only be removed in periods of high demand. As such, the water near the top of the reservoir volume may reside in the reservoir for a long period of time, becoming stagnant and creating many problems. For instance, excessive water age and stagnation may result in microbial growth, biofilm formation, unstable water chemistry, inadequate disinfectant levels, and/or increased formation of disinfection byproducts. Stagnant water may contain unwanted biological organisms, have poor taste and odor, and may not meet regulatory requirements. This is further exacerbated in the summer months, as new colder water is added to the bottom of a reservoir, the water that has been in the reservoir for a long period of time will stay at the top because warmer water is less dense than colder water. This is known as thermal stratification, which may lead to stagnation and its negative effects. Therefore, to prevent excessive water age, thermal stratification, and stagnation, mixing systems may be installed in water reservoirs within distribution systems. However, conventional mixing systems are expensive to build, operate and maintain. In addition, conventional mixing systems may not completely mix the water within reservoirs and are not designed to drain older water before draining newer water.

For instance, some conventional mixing systems utilize mechanical mixers. One example of a mechanical mixing system is a manifold mixer, which is an apparatus where valves and/or nozzles feed liquid through a manifold to generate mixing. Manifold mixers are used in conjunction with pumps and/or air compressors to achieve the desired mixing of water within a reservoir. Due to the complexity and numerous components of these systems, they are expensive to purchase and install. Since manifold mixers are usually situated within a reservoir, repair and maintenance are also difficult and the likelihood of water contamination is high. For service crews to access the manifold mixer in the tower, they must either drain the tower or enter the water for repairs and maintenance. This increases the likelihood of contaminants being introduced to the water during service. The use of air compressors also increases the likelihood of contaminants entering the water during use, as air compressors may inject contaminants from the ambient air into the system. Pneumatic conduits, hoses, and tubes pose particular risk of contamination as they may harbor bacterial growth protected from disinfection within the tank. In addition, since a manifold mixer generally includes several mechanical components, each of those components is subject to failure and requires maintenance. This may result in inefficient mixing, inadequate disinfectant levels, energy loss, and system failure. Mechanical mixing systems are also inefficient, as they work against the gravitational potential energy of water stored within the tank.

Other conventional mixing systems rely on a pump or a series of pumps to constantly circulate water within the reservoir. These systems may also use motor driven impellors, vanes, turbines, or blades and may be pneumatically assisted. The pumps and motor driven devices of these systems are usually situated near the bottom of the reservoir or on the lower exterior of the reservoir and may cause contact damage with the reservoir's internal structures. Many times, due to size and electrical power restrictions, these mixing systems may not be strong or large enough to move water from the bottom to the top of the reservoirs. These systems rely upon establishing currents within the reservoir to achieve complete mixing, but may not take into consideration filling and draining cycles that may occur minutes apart and disrupt mixing currents. Pumps upstream of the reservoir may also be employed. These types of systems have high energy and maintenance requirements. Specifically, circulation pumps and motor driven mixers have high power demands and must be replaced or repaired frequently. These mixing systems are also inefficient, as they work against the gravitational potential energy of water stored within the tank. Depending on the placement of the pumps and motorized mixers within the reservoir, inspecting and servicing this equipment may be inconvenient or even impossible. The same is true of pumps upstream of the reservoir. If such pumps are owned or controlled by a third party, there is no guarantee the pump will be maintained or calibrated to provide the required pressure for operation of the system.

One popular system that relies on pumps to circulate water is called the "Fresh-Mix" system by Chicago Bridge & Iron Company. As disclosed in U.S. Pat. No. 5,735,600, the Fresh-Mix system relies on water to be pumped into the reservoir and may utilize a recycling pump in conjunction with a draft tube that allows for a siphon mixing effect of the water surrounding the reservoir inlet(s). In addition to the issues mentioned above, the Fresh Mix system employs a draft tube that is spaced substantially above the inlet, which allows for energy loss in the system, and many times new water being introduced to the system does not reach the top of the draft tube for release near the top of the reservoir. Chicago Bridge & Iron Company attempted to address this issue in U.S. Pat. No. 7,748,891. The system disclosed in this patent purports to improve upon the Fresh Mix system by allowing for multiple draft tubes aligned in series along the height of the reservoir. However, this arrangement fails to ensure new water will be circulated to the top of the reservoir volume, as the usage of multiple draft tubes with substantial space between them may decrease the likelihood that new water will reach the top. This arrangement also fails to address the large energy requirement to pump water into the system, where large openings allow ambient water into the draft tubes, resulting in substantial energy loss at each opening. It also fails to address issues with service and contaminants, as this updated system includes more components than the Fresh-Mix system, presumably increasing maintenance and service demands and contamination concerns.

A need exists for an apparatus, system, and method for the efficient delivery of new water to reservoirs. Such apparatuses, systems, and methods should provide adequate circulation and mixing to attain uniformity of water quality, be energy efficient, prevent stagnation and stratification of the water within the reservoir, and drain older water prior to newer water.

SUMMARY OF THE INVENTION

It is therefore a primary object, feature, and/or advantage of the present invention to provide an improved device and methods of use thereof that overcome deficiencies in the prior art.

It is another object, feature, and/or advantage of the present invention to provide a device that prevents stagnation of water within a reservoir.

It is another object, feature, and/or advantage of the present invention to provide a device that prevents thermal stratification of water within a reservoir.

It is another object, feature, and/or advantage of the present invention to provide a device that prevents excessive water age within a reservoir.

It is another object, feature, and/or advantage of the present invention to provide a device that prevents icing within a reservoir.

It is another object, feature, and/or advantage of the present invention to provide a device that ensures the first water delivered to a reservoir is the first water out of the reservoir.

It is another object, feature, and/or advantage of the present invention to provide a device that ensures new water is delivered to the top of the water volume within a reservoir.

It is another object, feature, and/or advantage of the present invention to provide a device that includes one or more inversion chambers.

It is another object, feature, and/or advantage of the present invention to provide a device that ensures water is circulated within a reservoir without the use of additional pumps, air compressors, motors, moveable components, or mechanical mixers.

It is another object, feature, and/or advantage of the present invention to provide systems and methods for use in a water reservoir, where the reservoir will fill in a staged manner.

It is another object, feature, and/or advantage of the present invention to provide systems and methods for use in a water reservoir, where the reservoir will consistently fill above or near the existing volume level of water within the reservoir.

It is another object, feature, and/or advantage of the present invention to provide systems and methods for use in a water reservoir where water is consistently introduced to a reservoir in a downflow manner.

It is another object, feature, and/or advantage of the present invention to provide systems and methods for use in a water reservoir where stored energy within water introduced to a reservoir is utilized to circulate water.

It is another object, feature, and/or advantage of the present invention to provide systems and methods for use in a water reservoir that employs the gravitational potential energy within stored water to direct inlet flow.

It is another object, feature, and/or advantage of the present invention to provide systems and methods for use in a water reservoir that requires no added energy and creates net zero carbon emissions.

It is another object, feature, and/or advantage of the present invention to provide a device for the efficient delivery of new water to reservoirs that reduces the risk of contamination from external sources or by service equipment and operators entering the reservoir.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the invention, an apparatus for placement into a water storage tank is provided. The apparatus comprises a first transition conduit assembly. The first transition conduit assembly includes a first inversion chamber housing connected to a first transition conduit, and the first inversion chamber housing includes a frustoconical portion. The first transition conduit assembly is adapted to create a first inversion gap when positioned above an inlet of the water storage tank. In one embodiment, the apparatus may further include a second transition conduit assembly, where the second transition conduit assembly is adapted to create a second inversion gap when positioned above the first transition conduit assembly. The first and second transition conduit assemblies may comprise steel.

According to another aspect of the invention, a water storage apparatus is provided. The water storage apparatus comprises a tank, an inlet, and a first transition conduit assembly. The first transition conduit assembly includes a first inversion chamber housing connected to a first transition conduit, and the first inversion chamber housing includes a frustoconical portion. The first transition conduit assembly creates a first inversion gap when positioned above the inlet. In one embodiment, the water storage apparatus may include a second transition conduit assembly, where the second transition conduit assembly may create a second inversion gap when positioned above the first transition conduit assembly.

DETAILED DESCRIPTION OF EXEMPLARY EMBODIMENTS

Figure 1:
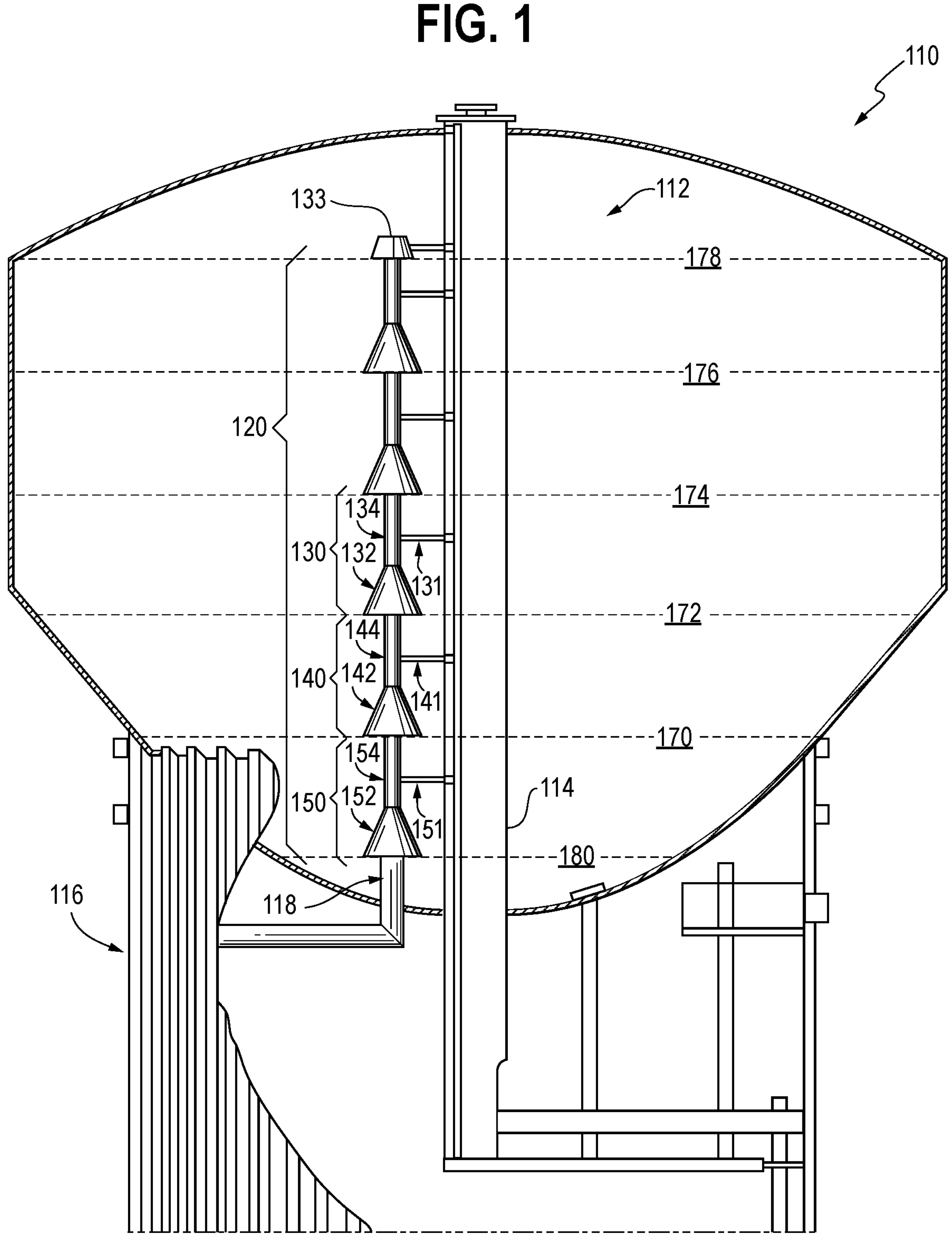
FIG. 1 is a cut-away elevation view of a first embodiment of an inversion filling system in an elevated drinking-water distribution reservoir having a single inlet-outlet.

Referring now to the drawings wherein like numerals refer to like parts, FIG. 1 is a cut-away view of a first embodiment of an improved water distribution reservoir 110. Improved water distribution reservoir 110 is depicted as an elevated reservoir comprising a tank 112, a central access tube 114, support 116, an inlet-outlet 118, and inversion filling system 120. Reservoirs utilizing inversion filling systems of this disclosure will consistently fill in a staged manner from above or near the existing volume level of water within the reservoir.

Tank 112 has an interior storage area where water is stored. The illustrated tank 112 is a 1.5-million-gallon tank that is held and stabilized by support 116, however the invention may be utilized with a tank of any capacity. Support 116 may be a wall, pedestal, legs or a combination thereof. Central access tube 114 extends upwardly though the center of tank 112. Inlet-outlet 118 serves as both an inlet for new water to be introduced to tank 112 and as an outlet for water from tank 112. Inlet-outlet 118 will function as an inlet or outlet depending on the state and needs of the water distribution system. However, other inlet/outlet configurations may be utilized with this embodiment. The top of tank 112 may be at any elevation up to 200 feet or higher from grade. Operating levels 180, 170, 172, 174, 176, 178 may be approximately 10 feet apart, but are preferably spaced anywhere between 5 and 25 feet. The invention can be used in storage tanks of different heights and arrangements, and with other types of water storage reservoirs, such as standpipes or ground storage tanks.

The amount of water stored in tank 112 varies over time as new water is added or as water is withdrawn for use. Operating levels 180, 170, 172, 174, 176, 178 are the levels where new water will be delivered and enter tank 112 at the bottom of each transition conduit assembly. For instance, if tank 112 held a volume of water just below operating level 170, water would enter through inlet-outlet 118 and be directed through transition conduit assembly 150, to be released into tank 112 through the top of transition conduit assembly 150 near operating level 170. The new water pushes downward past the top of the tank volume (near operating level 170). As such, stagnation and stratification are prevented by filling and mixing the water via downflow, where new water is delivered to the top of the tank 112 volume.

Inversion filling system 120 comprises a series of hydraulically-connected transition conduit assemblies 130, 140, 150. FIG. 1 shows a total of five transition conduit assemblies within tank 112, but the number of assemblies utilized in a reservoir depends on several factors, including but not limited to the size of the reservoir and the inflow/outflow demands of the system. Transition conduit assemblies 130, 140, 150 may be further understood by the partial cross-sectional view provided in FIG. 2.

A transition conduit assembly 130 generally comprises an inversion chamber housing 132 and a transition conduit 134. Inversion chamber housing 132 is a structure having an interior chamber connected to transition conduit 134, illustrated as a frustoconical portion. A frustoconical shape is preferred for inversion chamber housing 132 because the conical interior acts to guide new fill water down and outward for mixing with water already stored in the reservoir. However, inversion chamber housing 132 may take on any shape as long as the inner profile of inversion chamber 136 is large enough to receive a flow of water from a reservoir inlet or another upstream transition conduit (such as transition conduit 144), while confined enough to create sufficient equilibrium to allow formation of hydraulic conduits. For instance, in embodiments where the inner profiles of the transition conduit assemblies have a diameter, it is preferred for the diameter of the transition conduit assemblies to be roughly equal to the diameter of the reservoir inlet of the installation site. This is to ensure the transition conduit assemblies will accept all inflow from the reservoir inlet and not create a siphon. It also prevents loss of inflow stream energy and prevents the loss of new water to the lower portions of the reservoir. The interior of inversion chambers may also be fit with directional vanes.

Inversion chamber housing 132 comprises an inversion chamber 136 with a profile that allows for the outflow of new water through inversion gap 138. New water will flow from inversion gap 138 under several circumstances. The first circumstance is when the water level in tank 112 is below the top of transition conduit 144, but also above the top of transition conduit 154 and inversion gap 148. Second, water will also flow from inversion gap 138 when the water level in tank 112 is above the top of transition conduit 144, but the water has not yet risen to a point where exit via inversion gap 138 is hydraulically blocked. There will reach a point where the water level in tank 112 rises above the top of inversion conduit 144 and inversion gap 138 to where water no longer flows out of inversion gap 138. When it reaches that level, new water is directed to the next inversion conduit assembly above inversion conduit assembly 130. It should also be noted that under circumstances where the new water is entering inversion filling system 120 via inlet 118 with great speed or force, new water may exit through inversion gap 138 even if the water level is low (e.g., at or near operating level 180).

Inversion gap 138 should be large enough to allow full flow capacity of the inlet while small enough that it does not interfere with the hydraulic connection between transition conduit assemblies. Generally, inversion chamber 136 and inversion gap 138 are sized and positioned to allow for the equalization of force between stored water and inlet flow, yet still allow for hydraulic connection with other upstream and downstream transition conduit assemblies when transition conduit assembly 130 is submerged. It is further noted that inversion chamber housing 132 acts to prevent the inflow of older water into inversion filling system 120 because this would impede water inflow, potentially requiring additional components and energy for the new water to be delivered to the top of the volume of tank 112.

Transition conduit 134 comprises a conduit for transporting water or other fluids that is connected to inversion chamber housing 136. While a section of a standard cylindrical pipe is preferred for transition conduit 134, it should be understood that any other shape may be used for transition conduits, such as conduit or pipe with a rectangular or elliptical cross-section. It should also be understood that transition conduit 134 may be permanently affixed to, formed with, detachably connected, or otherwise aligned with inversion chamber housing 136.

Figure 2:
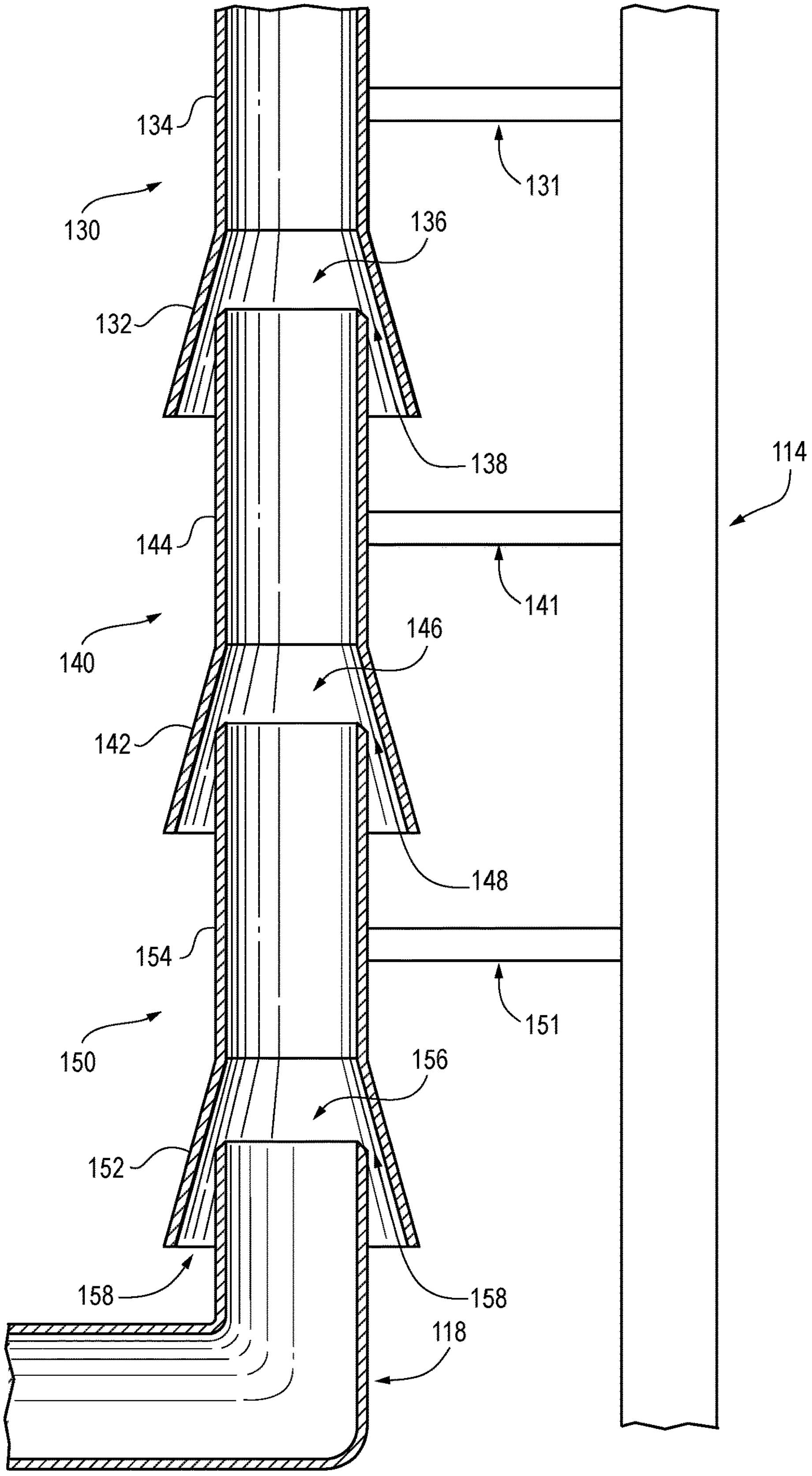
FIG. 2 is a partial cross-sectional view of the inversion filling system shown in FIG. 1.

In the embodiment of the invention shown in FIGS. 1 and 2, transition conduit assemblies are fixed in place within a reservoir by the use of mounting brackets 131, 141, 151. Mounting brackets 131, 141, 151 are attached to transition conduits 134, 144, 154 at one end and to the central access tube 114 of tank 112 at the other end. Transition conduit assemblies may be formed with a mounting bracket or may have a mounting bracket attached thereto. Mounting brackets 131, 141, 151 may be used alone or in conjunction with other components for the stabilization of the transition conduit assemblies. For instance, transition conduit assemblies may include pegs and holes to ensure proper alignment. For instance, such an embodiment may include pegs in the top of a transition conduit portion 144 and holes at or near the bottom portion of inversion chamber housing 132 for receiving the pegs. In another embodiment, inversion chamber housing 132 may include legs for connection, attachment, or alignment with transition conduit 144.

The systems of the invention may also utilize a terminal inversion chamber or deflector above the transition conduit assembly furthest from the inlet. As shown in FIG. 1, terminal inversion chamber 133 is situated generally at the high-capacity level 178 of tank 112. Terminal inversion chamber 133 is illustrated as a frustoconical portion with an open bottom and closed top, where the interior diverts vertical water flow, originating from the transition conduits, downward and outward into tank 112. Alternatively, terminal inversion chamber 133 may simply be a deflector, which is a planar body situated at a distance above the inversion conduit assemblies, capable of deflecting water flow outward into tank 112. In some embodiments, a deflector could be placed just inches above the inversion conduit assemblies, in other embodiments, a deflector may be placed up to 20 feet above the inversion conduit assemblies.

Figure 3:
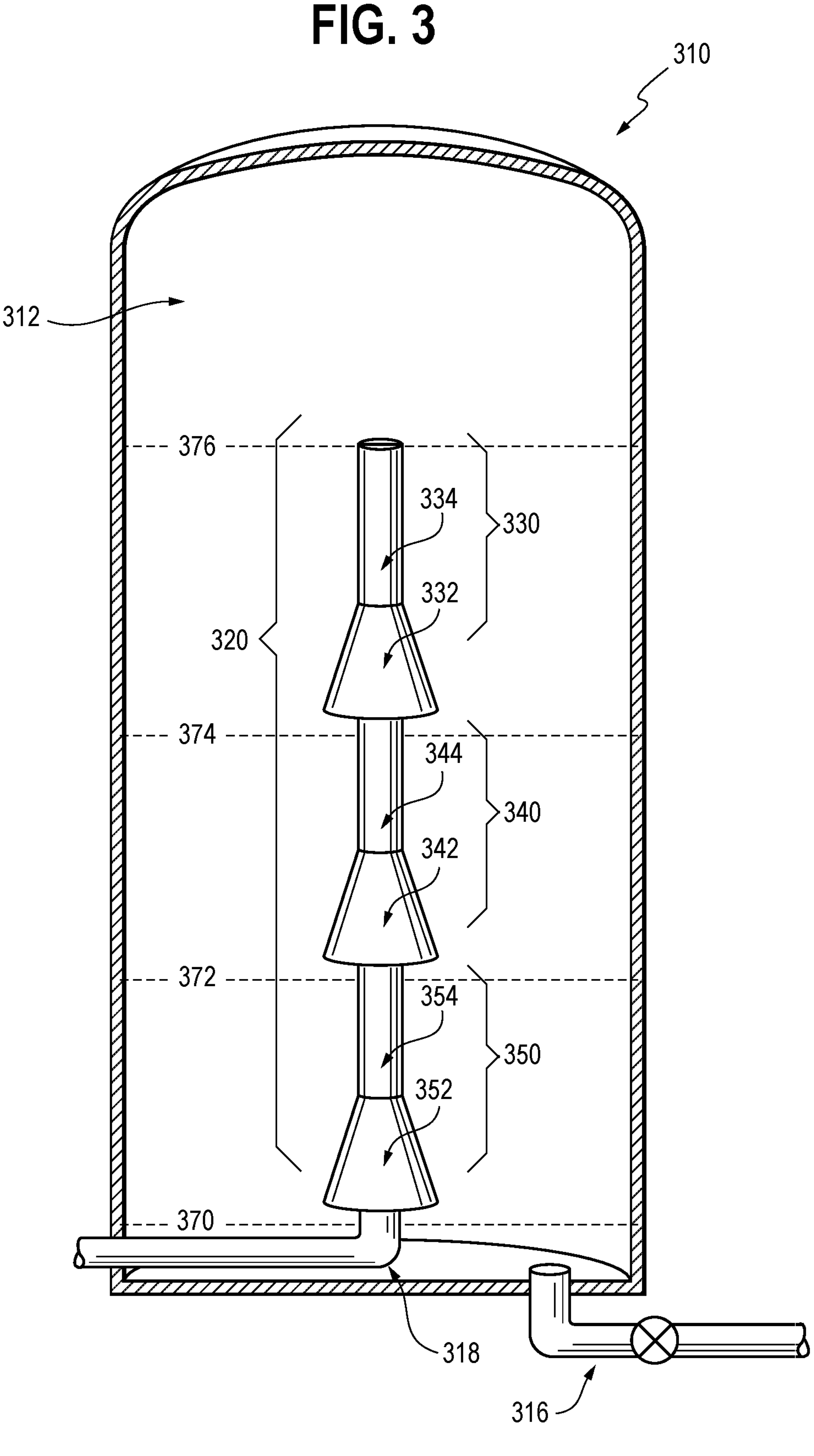
FIG. 3 is a cut-away elevation view of a second embodiment of an inversion filling system in a ground-level water distribution reservoir having an inlet and a separate outlet.
Figure 4:
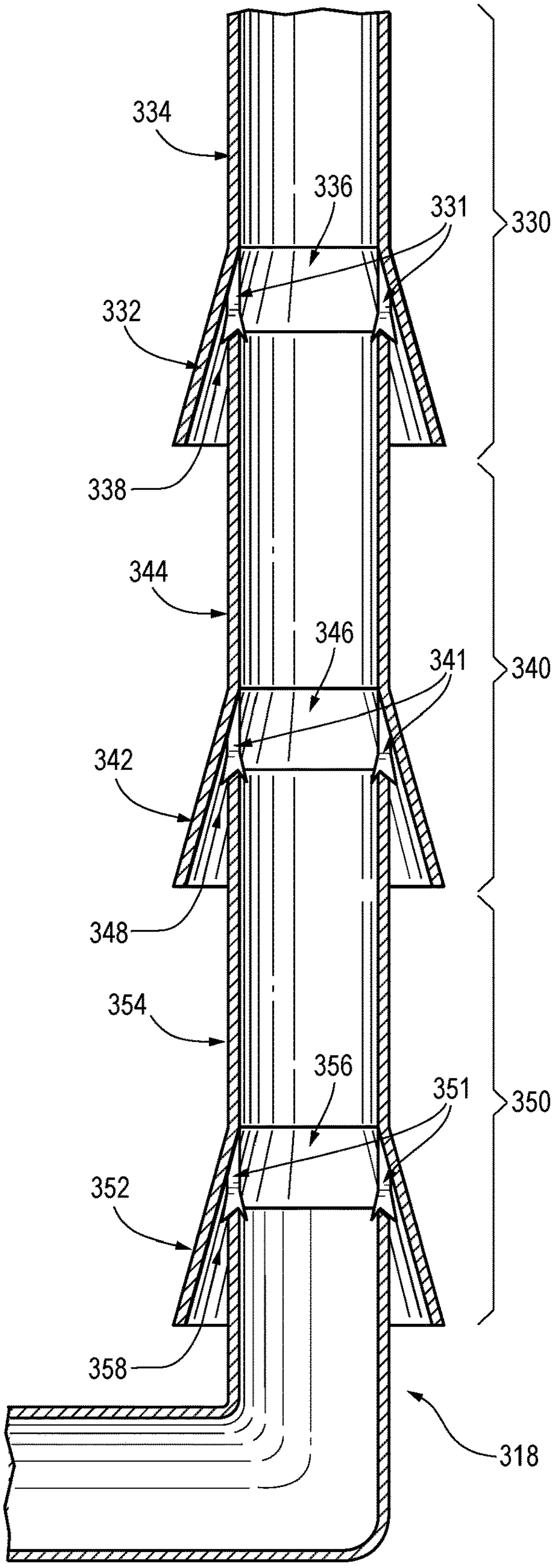
FIG. 4 is a cross-sectional view of the inversion filling system shown in FIG. 3.

FIGS. 3 and 4 show a second embodiment of the invention, where an inversion filling system 320 is installed in a ground-level water distribution system 310 having a ground-level tank 312, an inlet 318 and a separate outlet 316. Ground-level tank 312 is a 2.0-million-gallon capacity tank but may be of any size and shape. In this embodiment of the invention, transition conduit assemblies 330, 340, 350 include legs 331, 341, 351 for stabilization. As mentioned above, a frustoconical terminal inversion chamber or a deflector (not shown) may be situated above the final transition conduit 334 near the high-capacity level of the reservoir to support water dispersion and downflow.

Aside from the items listed above, the components of inversion filling system 320 are similar to those of the embodiment of FIG. 1. Inversion filling system 320 comprises a series of hydraulically-connected transition conduit assemblies 330, 340, 350. FIG. 3 shows a total of three transition conduit assemblies within tank 312. Transition conduit assemblies 330, 340, 350 may be further understood by the cross-sectional view provided in FIG. 4. Transition conduit assembly 330 comprises inversion chamber housing 332 and transition conduit 334. Inversion chamber housing 332 comprises inversion chamber 336 with a profile that allows for the outflow of new water through inversion gap 338. Transition conduit assembly 340 comprises inversion chamber housing 342 and transition conduit 344. Inversion chamber housing 342 comprises inversion chamber 346 with a profile that allows for the outflow of new water through inversion gap 348. Transition conduit assembly 350 is situated above inlet 318 and comprises inversion chamber housing 352 and transition conduit 354. Inversion chamber housing 352 comprises inversion chamber 356 with a profile that allows for the outflow of new water through inversion gap 358.

In the embodiment of the invention shown in FIGS. 3 and 4, transition conduit assemblies are fixed in place within a reservoir by stacking the assemblies and using legs 331, 341, 351 for stabilization. FIG. 4 illustrates where legs 331, 341 are connected to transition conduits 344, 354 at one end and to an interior portion of inversion chamber housing 342, 332 at the other end. Since transition conduit assembly 350 rests on inlet 318, legs 351 are connected to the top of inlet 318 at one end and connected to an interior portion of inversion chamber housing 352 at the other end.

Each transition conduit assembly may utilize two or more legs. Generally, the use of more legs will result in more stability to the system, however, the legs must not interfere with the functions of inversion chambers 336, 346, 356 or inversion gaps 338, 348, 358. For instance, while the use of legs may decrease the size of the inversion gaps, the dynamics of the system should not be negatively affected by the use of legs. Therefore, the use of larger inversion gaps may be employed to accommodate the use of legs. Transition conduit assemblies may be formed with legs or may have legs attached thereto. In some embodiments, legs may be free-standing and held in place by the weight of the transition conduit assemblies. Legs 331, 341, 351 may be used alone or in conjunction with other components for the stabilization of the transition conduit assemblies. For instance, transition conduit assemblies may include legs and mechanical fasteners. In another embodiment, inversion filling system 320 may utilize legs along with additional structural supports for transition conduit assemblies, such as mounting brackets, that provide transition conduit assemblies stabilizing connections to a portion of tank 312.

In operation, an inversion filling system of the invention is installed into a tank in a water distribution system. Alternatively, a tank for a water distribution system may be manufactured with the components of the inversion filling systems of the invention pre-installed. After a water source is attached to the tank within the water distribution system, water begins to enter the tank, via an inlet. Once the water level of the tank reaches the lowest point of a first transition conduit assembly that is situated closest to the bottom of the tank, water will initially enter the reservoir via the first inversion chamber through its inversion gap. The water entering the tank will also travel up through the first transition conduit assembly toward a second transition conduit assembly situated directly above the first transition conduit assembly. As long as the water volume in the tank has not achieved a water level high enough, for its weight combined with the weight of water within the first inversion chamber, to resist the force of inlet flow and create equilibrium in the first inversion chamber, inlet flow will enter the reservoir through the first inversion chamber and gap. Once equilibrium is established in the first inversion chamber, the newly added water to the system will travel all the way through the first transition conduit assembly and be directed into the inversion chamber of the second transition conduit assembly. The water in the inversion chamber of the second transition conduit assembly will be diverted downward and outward and exit the inversion filling system at the inversion gap of the second transition conduit assembly and enter the top of the tank volume.

As the tank fills and the first two transition conduit assemblies become completely submerged in water, the third transition conduit assembly begins to be partially submerged. Equilibrium is then established in the first two inversion chambers, and the newly-added water entering the tank will travel up through the first and second transition conduit assemblies toward the third transition conduit assembly situated directly above the second transition conduit assembly. The water will then enter the inversion chamber of the third transition conduit assembly. The water in the inversion chamber of the third transition conduit assembly will be diverted downward and outward and exit the inversion filling system at the inversion gap of the third transition conduit assembly and enter the top of the tank volume. Once equilibrium is established in the first, second, and third inversion chambers, newly-added water will travel upward through all three transition conduit assemblies.

This process repeats for any additional transition conduit assemblies present in the tank. The result of operation is that newly-added water is delivered to the top of the reservoir volume without the need for additional pumps, air compressors, or mechanical mixers. In addition, an outlet is present at or near the bottom of the tank in most reservoirs, and when water is drawn from such a tank including a filling system of the invention, older water from the bottom of the tank is drawn out first. If the water level falls during operation, new water will usually enter the tank at the inversion gap of the transition conduit assembly closest to the water level.

A method for making an inversion filling system is provided below. The method includes determining the number of transition conduit assemblies required for a tank in a water distribution system and providing the transition conduit assemblies. Transition conduit assemblies may be formed by (repeatedly, based on need) forming an inversion chamber housing in conjunction with a portion of transition conduit. The inversion chamber housing and transition conduit may be formed as a single piece, fixed together, or removably attached. Mounting brackets, legs, or other supports may optionally be formed with, attached to, or used in conjunction with at least one of the transition conduit assemblies. A cap or terminal inversion chamber housing may be formed and provided. The transition conduit assembly or assemblies and optional cap/terminal inversion chamber housing are stacked or otherwise arranged vertically within the tank generally above an inlet.

A method for making an improved water distribution reservoir includes placing an inversion filling system within a water distribution reservoir. The inversion filling system is placed directly above an inlet for the water distribution system, and optionally mounting the inversion filling system to the water distribution reservoir. The inversion filling system may alternatively or additionally be stabilized within the water distribution reservoir. Alternatively, a water distribution reservoir may be manufactured with an inversion filling system, where the components of the inversion filling system are formed and provided with the tank.

Most of the components of inversion filling system may be formed by any known manufacturing process for metal, steel, plastic, or ceramic parts, such as forging, machining, molding, welding, pressing, injection molding, CNC machining, 3-D printing, or the like. The components of the inversion filling system may also be coated. Such coatings preferably comprise inert material to prevent leaching of chemicals from or unwanted chemical reactions with the underlying component material. Corrosion resistant coatings and treatments acceptable for the wet interior of water reservoirs may also be utilized for inversion filling system components. Antimicrobial coatings may also be utilized for inversion filling system components.

While many embodiments of the invention are for use in drinking water reservoirs and fresh/potable water distribution systems, the invention is not limited to such applications. This invention may be utilized in reservoirs that contain many different types of fluids, including but not limited to potable water, process water, wastewater, or other fluids that benefit from mixing and/or first-in/first-out cycling to prevent stagnation, thermal stratification, and aging.

The disclosed embodiments have many attendant advantages. As a first example, stagnation and thermal stratification of water within a reservoir is prevented by providing filling and mixing from the top of the reservoir's water volume level. As a second example, older water is drained first, which reduces water age, enhances water quality, and further prevents stagnation and thermal stratification. As a third example, the embodiments of the invention provide decreased environmental impact by providing a solution that does not require the use of additional pumps or other powered devices that consume energy.

It should be understood that various changes and modifications to the presently disclosed embodiments described herein will be apparent to those skilled in the art. Such changes and modifications may be made without departing from the spirit and scope of the present inventions and without diminishing their attendant advantages. It is, therefore, intended that such changes and modifications be covered by the appended claims.

The invention is claimed as follows:

1. An apparatus for placement into a water storage tank comprising:
- a first transition conduit assembly;
- wherein the first transition conduit assembly comprises a first inversion chamber housing connected to a first transition conduit;
- wherein the first inversion chamber housing comprises a frustoconical portion; and
- wherein the first transition conduit assembly is adapted to create a first inversion gap when positioned above an inlet of the water storage tank;
- a second transition conduit assembly;
- wherein the second transition conduit assembly comprises a second inversion chamber housing connected to a second transition conduit;
- wherein the second inversion chamber housing comprises a frustoconical portion;
- wherein the second transition conduit assembly is adapted to create a second inversion gap when positioned above the first transition conduit assembly; and
- wherein the first transition conduit extends into the frustoconical portion of the second inversion chamber housing.

2. The apparatus of claim 1, further comprising at least one stabilizing member connected to the second inversion chamber housing.

3. The apparatus of claim 2, wherein the at least one stabilizing member comprises a leg connected to an interior of the second inversion chamber housing, and the first transition conduit and the second transition conduit comprise pipe portions.

4. The apparatus of claim 2, wherein the first transition conduit assembly and second transition conduit assembly comprise steel.

5. The apparatus of claim 4, wherein the water storage tank is adapted to hold a fluid selected from the group consisting of potable water, process water, and wastewater.

6. The apparatus of claim 5, further comprising a deflector for placement above the second transition conduit assembly.

7. The apparatus of claim 5, further comprising a terminal inversion chamber comprising a frustoconical portion with an open bottom and closed top.

8. The apparatus of claim 7, wherein the terminal inversion chamber is adapted for placement above the second transition conduit assembly.

9. The apparatus of claim 8, wherein the first inversion gap and the second inversion gap are equivalent in size.

10. The apparatus of claim 9, wherein the first inversion gap and the second inversion gap are equivalent in size to an inside diameter of the inlet.

11. A water storage apparatus comprising:
- a tank;
- an inlet;
- a first transition conduit assembly;
- wherein the first transition conduit assembly comprises a first inversion chamber housing connected to a first transition conduit, and the first inversion chamber housing comprises a frustoconical portion;
- wherein the first transition conduit assembly creates a first inversion gap when positioned above the inlet;
- a second transition conduit assembly;
- wherein the second transition conduit assembly comprises a second inversion chamber housing connected to a second transition conduit and the second inversion chamber housing comprises a frustoconical portion;

wherein the second transition conduit assembly creates a second inversion gap when positioned above the first transition conduit assembly; and wherein the first transition conduit extends into the frustoconical portion of the second inversion chamber housing.

12. The apparatus of claim 11, further comprising a terminal inversion chamber comprising a frustoconical portion with an open bottom and closed top; wherein the terminal inversion chamber creates an additional inversion gap when placed above the second transition conduit assembly.

13. The apparatus of claim 11, further comprising at least one stabilizing member connected to the second inversion chamber housing.

14. The apparatus of claim 13, wherein the at least one stabilizing member comprises a leg connected to an interior of the second inversion chamber housing.

15. The apparatus of claim 14, further comprising a terminal inversion chamber comprising a frustoconical portion with an open bottom and closed top; wherein the terminal inversion chamber creates an additional inversion gap when placed above the second transition conduit assembly.

16. The apparatus of claim 15, wherein the first transition conduit assembly and second transition conduit assembly comprise steel.

17. The apparatus of claim 16, wherein the water storage tank is adapted to hold a fluid selected from the group consisting of potable water, process water, and wastewater.

18. The apparatus of claim 15, wherein the first inversion gap and the additional inversion gap are equivalent in size.

19. The apparatus of claim 18, wherein the first inversion gap and the second inversion gap are equivalent in size to an inside diameter of the inlet.

20. The apparatus of claim 11, wherein the inlet further comprises an outlet.

* * * * *